United States Patent Office 2,891,026
Patented June 16, 1959

2,891,026

COMPOSITION COMPRISING A SOLUTION OF A GLYCIDYL POLYETHER AND A GLYCIDYL ETHER OF A MONOHYDRIC PHENOL

David Wasserman, Irvington, N.J., assignor to Minnesota Mining and Manufacturing Company, St. Paul, Minn., a corporation of Delaware No Drawing. Application April 15, 1955
Serial No. 501,733

9 Claims. (Cl. 260—30.4)

This invention relates to novel compositions of matter and to methods for preparing them. In one of its more specific aspects the invention is directed to novel compositions of matter produced by combining (A) glycidyl polyethers of aliphatic polyhydric alcohols or of polyhydric phenols, said polyethers having a 1,2-epoxy equivalency greater than 1 and being liquid at 300° F. with (B) a glycidyl ether of a monohydric phenol having on its nucleus an unsaturated hydrocarbon substituent of 10–28 carbon atoms, in which the unsaturation is due to ethylenic linkage, which may be one or more in number. Said materials (A) and (B) may be combined by merely mixing them together and in general with or without the application of heat, depending upon the particular materials (A) and (B) employed, solution is obtained. The ratio by weight of (A) to (B) varies over a wide range depending upon the specific characteristics desired in the end product and/or the particular materials (A) and (B) employed and may be by weight 100 parts of (A) to 2–900 parts of (B).

Said glycidyl polyethers of the aliphatic polyhydric alcohols are obtainable by practicing the methods known to the art, an example of which is to react such alcohol with epichlorhydrin or glycerol dichlohydrin in the presence of a suitable acid catalyst, such as boron trifluoride and then converting said reaction product to polyepoxide by employing suitable alkaline agents, such as sodium hydroxide, sodium aluminate, etc. Examples of some of said glycidyl polyethers are those of such alcohols as diethylene glycol, propylene glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than one mole of epichlorhydrin per equivalent of phenolic hydroxyl group of the phenol and a slight stoichiometric excess of base such as about 2% to 30% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula

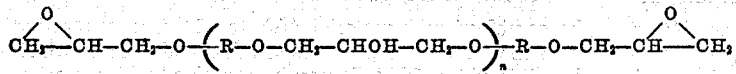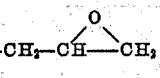

wherein n is an integer of the series 0, 1, 2, 3 . . . , and R represents the divalent hydrocarbon radical of the dihydric phenol. While for any single molecule of the polyether n is an integer, the fact that the obtained polyether is a mixture of compounds causes the determined value for n, e.g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The 1,2-epoxy equivalency of the glycidyl polyether refers to the number of 1,2-epoxy groups

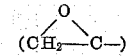

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N pyridinium chloride in chloroform solution at the boiling point under reflux for two hours whereby the pyridinium chloride, hydrochlorinates the epoxy groups to chlorhydrin groups. After cooling, the excess unreacted pyridinium chloride is back-titrated with 0.1 N sodium hydroxide in methanol to the phenolphthalein end point. The epoxide value is calculated by considering one HCl as equivalent to one epoxide group. This method is used for obtaining all epoxide values discussed herein.

Any of the various polyhydric phenols is used in preparing the polyethers employed in the invention including mononuclear phenols such as resorcinol, catechol, hydroquinone, methyl resorcinol, etc.; or polynuclear phenols like 2,2-bis (4-hydroxyphenyl) propane which is termed bis-phenol herein for convenience, 4,4'-dihydroxybenzophenone, bis (4-hydroxyphenyl)-methane, 1,1-bis (4-hydroxyphenyl) ethane, 1,1-bis (4-hydroxyphenyl) isobutane, 2,2-bis (4-hydroxyphenyl) butane, 2,2-bis (4-hydroxy-2-methylphenyl) propane, 2,2-bis (4-hydroxy-2-tertiary-butylphenyl) propane, 2,2-bis (2-hydroxy-naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bisphenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent with such reaction products being shown in the U.S. Patent to M. T. Harvey 2,317,607, issued on April 27, 1943, and glycidyl polyether of certain of said reaction products being shown in my U.S. Patent 2,665,266. Still other examples of said glycidyl polethers of bis-phenols are those which may be derived from any of the other bis-phenols produced according to said Harvey patent. Such bis-phenols may be reacted with epichlorhydrin in the presence of an alkali employing in general the procedure set forth in my aforesaid patent to produce the glycidyl polyethers of said other bis-phenols.

Examples of some of said materials (B) which may be employed are geranyl phenol, which is a monohydric phenol having a 10 carbon atom unsaturated hydrocarbon substituent on its nucleus, cardanol, which is monohydric phenol having a 15 carbon atom hydrocarbon substituent on its nucleus, with the substituent having 1–3 ethylenic linkages, gingkol, which is a monohydric phenol having a 15 carbon atom hydrocarbon substituent on its nucleus, with the substituent having one ethylenic linkage therein. Other compounds of that class are $C_6H_5OHC_{25}H_{49}$, etc. Said materials (B) may be prepared by reacting, in the presence of an alkaline catalyst, epichlorhydrin with a phenol having on its nucleus an unsaturated hydrocarbon substituent of 10–28 carbon atoms, with said unsaturation due solely to ethylenic linkage. The following example B is given merely by way of illustrating a specific procedure for producing such materials (B), all parts being given by weight unless otherwise specified.

Example B:                                            Parts
    Cardanol (vacuum distilled) _____ 1500
    Epichlorhydrin, 97% pure _____ 1425
    Sodium hydroxide (50% aqueous solution) __  450
    Hydrochloric acid (18% HCl) _____   14
    Toluene _____  750

A tared three neck five liter round bottom flask equipped with stirrer, thermometer, addition funnel and reflux condenser was charged with the cardanol and epichlorhydrin. The temperature of the solution was raised to 60° C. and the sodium hydroxide was then added over twenty minutes maintaining the temperature between 60–65° C. by water cooling. The mixture was then refluxed at 104° C. for two hours and upon cooling to room temperature neutralized with the hydrochloric acid. The neutralized reaction mixture was stripped of excess epichlorhydrin and water in vacuo. The last traces of water were removed at a pot temperature of 100° C. and a pressure of two millimeters of mercury. The toluene was added to the reaction mixture and the sodium chloride formed in the reaction removed by filtration. The filtrate was stripped of solvent at 20 mm. of mercury. The last traces of volatile material was removed at 100° C. under a pressure of 2 mm. of mercury to provide the glycidyl ether of cardanol, hereafter known as B–1 measuring 1803.5 parts, having viscosity, Brookfield at 25° C. of 62 centipoises and epoxide equivalent of 518 grams.

In the course of my experimentations with materials (A), I have discovered that certain unexpected properties may be imparted thereto by combining therewith one or more of said materials (B). Such combinations have viscosities less than that of the material (A) employed; the flexibility of such combinations when cured is appreciably greater than that of material (A) cured alone; the shatter-resistance of the cured combination is much greater than that of cured material (A) alone; material (B) acts as a plasticizer for material (A); material (A) may apparently be co-reacted with material (B) in the presence of a strong acidic or alkaline catalyst, such as boron trifluoride, sodium hydroxide, etc.; materials (A) and materials (B) apparently may be co-reacted with mutual reactants such as amines and polybasic carboxylic acids or their anhydrides which are equivalent thereto; said combinations of material (A) and material (B) when spread in a thin film, either with or without the use of a solvent to obtain a thin film depending upon the particular combination employed and subsequently maintained at 340° F. for 16 hours will be found at the end of that period to have been converted to the substantially solid and infusible state, that is, it is dry to the touch and infusible at 400° F. However, when material (A) alone when in like manner spread in such thin film and maintained in the same oven at 340° F. for the same period of time, will be still fusible at the end of that period and at 400° F. In order to obtain such infusible films by maintaining such combinations at elevated temperature of 300–400° F. for varying periods of time from 1–24 hours, I prefer that the ratio by weight of (A) to (B) be 100 parts of (A) to about 50–300 of (B). While those materials (A) which are liquid may be bodied to some extent by the use of heat and still be liquid at 70° F. none of these liquids when combined with metallic driers and spread in a thin film will air dry. However, when said liquids are combined with material (B) and especially in the proportions by weight of 100 of (A) to 50–300 of (B) to provide a solution, such solutions together with the same metallic driers, when spread in a thin film will air dry within 24 hours. Examples of the metallic driers referred to in this description are carboxylic acid salts of manganese, cobalt, lead, cerium, rare earths, zinc, etc. well known and used for years in the paint and varnish arts. The order of reactivity of the combinations of (A) and (B) with a hardening agent, such as amine, polycarboxylic acid or combinations thereof is substantially the same as that of (A) alone with the particular hardening agent employed. This I believe is due to the fact that the order of reactivity of (B) alone with the hardening agent is substantially the same as that of (A) alone with the same hardening agent. Apparently what occurs in the reaction of the (A) and (B) combinations with the hardening agents is that the respective components (A) and (B) are chemically bound to each through the hardening agent reactant to provide internal coupling of (A) and (B) bridged by the hardening agent employed resulting in internal plasticization. In general the ratio by weight of the combinations of materials (A) and (B) to the amine and/or polybasic carboxylic acid is 100 parts of the combination of (A) and (B) to 1–50 parts of amine depending upon the amine employed and the speed of reaction required; 100 parts of the combination of (A) and (B) to 5–150 parts of polybasic carboxylic acid. The ratio by weight of the combination of (A) and (B) to the combination of amine and polybasic carboxylic acid also may vary over a wide range depending upon the amine and polybasic carboxylic acid used, the ratio of amine to polybasic carboxylic acid and the speed of reaction and type of end product desired. In general the ratio by weight of amine to polybasic carboxylic acid may be .1–40 parts of the former to 100 parts of the latter and the ratio by weight of the combination of (A) and (B) to the combination of amine and polybasic carboxylic acid may be 100 parts of the former to about 5–160 parts of the latter. When amines alone are employed heat may or may not be used for curing depending upon the amine use, however, when the polybasic carboxylic acids are used heat is required and the temperature for curing may be 100° C. to 200° C. However, the reaction of the combinations of (A) plus (B) with amines and/or polybasic carboxylic acids may be terminated before the reaction product reaches the infusible stage and to such reaction products may be added one or a combination of two or more of said metallic driers and generally about .5–3% by weight thereof to provide products which when dissolved in organic solvent may be spread in thin films and air dried or oven dried at 100–200° C. to the solid and infusible state.

The amines and/or polycarboxylic acids may, if desired be combined with material (A) or (B) first by reaction with the oxirane rings and then this reaction mass which is still liquid at 300° F. may be combined with materials (A) or (B) and the combination cured to the final infusible state.

Some of the classes of said amines which may be employed are primary, secondary and tertiary aliphatic amines, aromatic amines, cyclic amines, heterocyclic amines, polyfuntional amines, etc. and specific examples of some of them are propyl amine, diethyl amine, methyl benzyl amine, aniline, naphthylamine, dimethyl aniline, cyclohexylamine, N,N diethyl cyclohexylamine, pyridine, alkyl pyridine, quinoline, N,N dimethyl alpha benzylamine, ethyl morpholine, piperidine, melamine, dialkyl melamine, dicycandiamide ethylene diamine, propylene diamine, 1,6 hexamethylene diamine, diethylene triamine, dipropylene triamine, triethylene tetramine, tetraethylene pentamine, 3,3-diethylaminopropylamine, etc.

Examples of some more of the amines which I prefer to employ are the aliphatic or aromatic amines and particularly those which are free of substituents reactable with the oxirane ring of a glycidyl ether of phenol and which do not have an active hydrogen atom on the amine nitrogen atom. This particular class of tertiary amines I employ when combined with a polybasic carboxylic acid and such combinations are used as hardening agents, although they may be used alone as hardening agents. Examples of some of these are (d) aromatic cyclic amines such as pyridine, alkyl pyridines and quinoline; (e) dialkyl aromatic amines such as dimethyl aniline; 4,4',4" methylidine tris (N,N, dimethyl aniline); 4,4', methylene bis (N,N dimethyl aniline); dimethyl amino methyl phenol; tri (dimethyl amino methyl) phenol; etc.; (f) tertiary alkyl amines such as benzyl dimethyl amine; tributyl amine; N,N dimethyl cyclohexylamine; N,N dimethyl alpha methylbenzylamine; and (g) aliphatic cyclic amines such as phenyl morpholine, ethyl morpholine, methyl morpholine, etc.

The polybasic carboxylic acids which I prefer to employ are those free of substituents reactable with the oxirane ring of a glycidyl ether of phenol and examples of some of them are (a) aromatic acids and anhydrides such as phthalic acid, terephthalic acid, phthalic anhydride, monochlorophthalic anhydride, dichlorophthalic anhydride, dihydrophthalic anhydride and tetrahydrophthalic anhydride, 1,2-naphthalic anhydride, 2,3-naphthalic anhydride; (b) alkyl dibasic carboxylic acids and anhydrides such as oxalic acid, succinic acid and anhydride, adipic, sebacic, azelaic acids and their polyanhydrides, chlormaleic anhydride, itaconic acid and its anhydride, etc. (c) maleic anhydride and its adducts which may be produced by Diels-Alder synthesis such as hexachlorocyclopentenyl succinic anhydride, tetrapropenyl succinic anhydride; dodecenyl succinic anhydride, tetrapropyl succinic anhydride; the reaction product of maleic anhydride with eleostearic acid anhydride; the reaction product of unsaturated terpenes such as limonene, pinene, camphene with maleic anhydride. Other examples of diene adducts of maleic anhydride are 4-cyclohexene-1,2 dicarboxylic anhydride; 1,5-dimethyl 1-2,3,4,6,7,8, hexahydronaphthalene - 3,7,8-tetracarboxylic dianhydride.

The following are examples illustrating the invention and are given merely by way of illustration and not limitation. All parts are given by weight unless otherwise specified to the contrary.

Example 1.—100 parts of any one or a combination of two or more of said materials (A) are charged into a glass vessel. Then 2–900 parts of one or a combination of two or more of said materials (B) are added thereto. If materials (A) and (B) in said vessel are both liquids, only mere stirring will be required to provide solution of the components. However, if any of material (A) therein is a solid, the mix should be heated above the melting point of the solid and maintained at that temperature until solution takes place.

Such solutions, whether made at room or elevated temperature, may be used as is, or may be thinned with a volatile solvent and have metallic driers such as cobalt, manganese, lead, etc. naphthenates added thereto to provide air drying film coatings for metals, paper, woven glass fabrics, etc. useful in the electrical, waterproofing and weatherproofing arts.

Said solutions may also be applied as impregnants and coatings for woven glass or asbestos fabrics after which the impregnated and coated fabrics are maintained at 300°–400° F. for up to 16 hours to convert said solutions to the solid and substantially infusible state. Such products are useful as electrical insulating materials and the asbestos base fabric is also useful in the field of friction elements such as clutch facings and brake linings.

Said solutions may be combined with various other components to provide a wide variety of impregnating varnishes, adhesives, laminating and electrical insulating compositions.

Said solutions may be reacted in situ with one or more of said amines and/or polycarboxylic acids for encapsulating transformers, etc.

Example 2.—The following glycidyl polyethers were mixed with the glycidyl ether of cardanol at room temperature to provide solution. The viscosities of the polyethers and solutions were measured. The solutions were mixed with hardening agents and the mixtures cured at 120° C. for 16 hours. The cured compositions were tested for hardness as shown in the following table wherein—

A-1 is a liquid "Bis-phenol A" (2,2 bis (parahydroxy phenyl) propane) glycidyl polyether having an epoxide equivalent of 190–210.

A-2 is a liquid cardanol-hydroxybenzene bis phenol glycidyl polyether having an epoxide equivalent of 400–500.

A-3 is a liquid glycidyl polyether of resorcinol having an epoxide equivalent of 160–180 grams.

A-4 is a glycidyl polyether of glycerine having an epoxide equivalent of 140–165 grams.

B-1 is the glycidyl ether of cardanol having an epoxide equivalent of 500–600 grams.

C-1 is triethylene tetramine.

C-2 is hexahydrophthalic anhydride.

Table.—Example 2

| No. | A-1 | A-2 | A-3 | A-4 | B-1 | C-1 | C-2 | Hardness Shore "D" | Viscosity,[1] Centipoises |
|---|---|---|---|---|---|---|---|---|---|
| 1 | 100 | | | | | 12 | | 88 | 11,700 |
| 2 | | 100 | | | | 6.5 | | 82 | 66,000 |
| 3 | | | 100 | | | 14 | | 91 | 1,510 |
| 4 | | | | 100 | | 16 | | 89 | 146 |
| 5 | 50 | | | | 60 | 9 | | 73 | 344 |
| 6 | | 100 | | | 45 | 8.7 | | 48 | 4,010 |
| 7 | | | | 50 | 60 | 11 | | 32 | 116 |
| 8 | 100 | | | | | | 55 | 88 | |
| 9 | | 100 | | | | | 35 | 84 | |
| 10 | | | 100 | | | | 55 | 88 | |
| 11 | | | | 100 | | | 55 | 85 | |
| 12 | 50 | | | | 60 | | 40 | 45 | |
| 13 | | 100 | | | 45 | | 46 | 43 | |
| 14 | | | 50 | | 60 | | 42 | 48 | 213 |
| 15 | | | | 50 | 60 | | 43 | 22 | |

[1] Viscosity of A-1 to A-4 and of B-1 before addition of hardening agent C-1 or C-2.

The combinations of components in 1–7 were maintained at 25° C. for 2–6 hours before curing at 120° C. for 16 hours; and the combinations of components in 8–15 were cured at 120° C. for 24 hours. All of the resultant cured castings were clear and showed the compatibility of B-1 with A-1 to A-4, even with the high concentrations of plasticizer B-1 used. There was no sweating out of B-1 on standing for several months.

Example 3.—Five parts of the glycidyl ether of cashew nut shell liquid was mixed with 0.05 part of a 6% solution of cobalt naphthenate and spread in a thin film on a steel panel. This solventless varnish with a viscosity of 360 centipoises dried tack-free in 20 minutes at 360° F. to provide an extremely flexible film.

The glycidyl ether of cashew nut shell liquid may be prepared in the following manner, all parts by weight: substantially completely decarboxylated cashew nut shell liquid which has been acid washed and having a viscosity at 25° C. of about 200 centipoises at 25° C.—4500 parts
Epichlorhydrin, 97% pure—2860 parts
Sodium hydroxide (50% aqueous solution)—1470 parts
Toluene—2250 parts A tared three neck twelve liter flask was equipped with reflux condenser, thermometer, addition funnel, and stirrer. It was charged with the cashew nut shell liquid and the epichlorhydrin. The alkali was added over a period of one hour at 30–35° C. The temperature was slowly raised to 104° C. and maintained at reflux for two hours. The cooled reaction mass was neutralized with 18% hydrochloric acid and the excess epichlorhydrin was recovered by vacuum distillation. The last traces of water was removed by heating the reaction mass to 100° C. at a pressure of 2 mm. of mercury. The toluene was added and the solution filtered through a bed of "cellite" on a Büchner funnel. The filtrate was stripped of volatiles to a pot temperature of 100° C. and a pressure of 2 mm. of mercury. The resultant product known as product (A–5 B–1) was the glycidyl ether of cashew nut shell liquid measuring 5260 parts having an epoxide equivalent of 575 grams and a viscosity at 25° C., Brookfield of 360 centipoises. This product is a combination of a material (A) and a material (B). It is a combination of glycidyl polyether of cardol known as material A–5 and glycidyl ether of cardanol known as B–1, with the ratio by weight of the former to the latter being approximately 12–25 of the former to 88–75 of the latter.

*Example 4.*—The following compositions were mixed with triethylene tetramine cast into molds that yielded cured 0.125" thick by 2.125" diameter discs and such cured discs were tested in six chemicals for resistance to leaching. The procedure of Federal Specification L–P–406B, Method 7011 was followed. After 7 day's immersion in the chemical at 25° C. the discs were dried and conditioned at 50° C. for three days to drive off solvents. A liquid glycidyl polyether derived from a cardanol-phenol reaction product having an epoxide equivalent of 400–500 grams was used in the three compositions D–1 to D–3 in the table. The plasticizer used in D–1 is B–1, the cardanyl glycidyl ether with an expoxide equivalent of 500–600 grams: In D–2 the plasticizer is a chlorinated diphenyl having a viscosity of 30–31 seconds Saybolt at 210° F. and in D–3 it is dioctyl phthalate. The hardening agent in all cases was triethylene tetramine.

The glycidyl polyether sixty parts, the plasticizer twenty-seven parts and the hardening agent five parts in compositions D–2 and D–3 and seven parts in composition D–1 was mixed and evacuated to remove bubbles. After casting on the siliconized steel molds they were evacuated again and a siliconized aluminum plate placed on top of the mold and weighted to squeeze out the excess material. The three compositions were cured for eight hours at 120° C. removed from the molds, conditioned and tested for leaching as in the Federal specification above. The following table indicates percent gain or loss, under the conditions of the test.

| Composition | 3% H₂SO₄ | 1% NaOH | Transformer Oil | Water | 10% HNO₃ | 5% Acetic Acid |
|---|---|---|---|---|---|---|
| D–1 | −0.07 | +0.28 | +0.25 | +0.03 | +0.14 | −0.02 |
| D–2 | −3.65 | −4.32 | −4.85 | −4.0 | −3.18 | −4.9 |
| D–3 | −0.22 | −0.49 | −0.13 | −0.38 | −0.25 | +0.89 |

*Example 5.*—B–1 and A–1 hereinbefore identified were cold mixed to provide solutions which were reacted with C–3 (diethylene triamine) for 4 hours at 25° C. and then 16 hours at 120° C., showed increased impact resistance. The Izod impact test, ASTM D–256–47T, heat distortion temperature, ASTM D–648–45T and Barcol Serial No. 935 hardness test were run on each sample.

| A–1 | Parts B–1 | C–3 | Heat Distortion Temperature, °C. | Barcol Hardness | Izod Impact, Ft.-lbs./inch |
|---|---|---|---|---|---|
| 100 | | 10 | 114 | 80 | 0.46 |
| 100 | 15 | 11 | 83 | 75 | 0.52 |

*Example 6.*—Exceptional increase in impact resistance was obtained for A–4 by addition of 120 parts of B–1 thereto and the combination was mixed with 43 parts of hexahydrophthalic anhydride and cured at 120° C. for 24 hours. The impact of a series of falling steel balls on such cured specimens 0.200±0.010" thick 2" in diameter, dropped from a height of six feet. Method of Bureau of Ships MIL–C–16923–A impact resistance test was used with two modifications; (1) decrease in thickness of sample to 0.2", and (2) increase in height from which ball falls to six feet. An average of three specimens indicated that the failure of the plastic occurred when a 3⅞" diameter ball was dropped. The unplasticized A–4, 100 parts and 55 parts of C–2 (hexahydrophthalic anhydride) cured for 24 hours at 120° C. failed when a 1½" diameter ball was dropped under the same conditions.

*Example 7.*—The B–1 above and (A–5, B–1) above hereinbefore identified show drying properties in admixture with such non-drying liquid glycidyl polyethers, such as that of "bis-phenol A." The glycidyl polyether of "bis-phenol A" has an epoxide equivalent of 190–210 grams which when spread in the liquid state on a steel panel and heated at 340° F. for sixteen hours did not dry to touch. However, a solution of one part of said glycidyl polyether of "bis-phenol A" and 2 parts of either B–1 or (A–5, B–1), where spread in a thin film on a steel panel will dry to touch after 16 hours at 340° F.

In making up compositions which are to be used as films to be air or oven dried, the combinations of (A) and (B) may or may not be thickened by heat alone or reacted with the hardening agents to the desired viscosity, but of course in all cases, the thickening or reaction is terminated before the combination reaches the infusible state. Then it has the desired driers in the required proportion added thereto and dispersed therethrough and generally together with an organic thinner in the desired amount to provide a type of varnish which may be coated in a thin film on to a base, the solvent evaporated therefrom and when maintained at 350° F. for 24 hours, the film will be solid and infusible. Such varnishes are particularly useful in the art of providing coating on cans, glass fabrics, etc.

*Example 8.*—330 parts of A–1 and 670 parts of B–1 were stirred to solution to which was added 110 parts of phthalic anhydride. The mix was heated at 350° F. for 10–15 minutes at which times the reaction mixture had considerably thickened. It was cooled down to room temperature and there was added 400 grams of xylene and 10 grams of cobalt naphthenate. This varnish was spread in a thin film on steel plate, solvent stripped at 80° C. and then kept in an oven at 350° F. for 16 hours after which time it was found to be a tough dry, infusible film.

*Example 9.*—5 parts of A–1 and 6 parts of B–1 mixed to solution. To this solution was added 0.9 part of C–1. Allowed to remain at room temperature for 3 hours and after that time was found to be solid. Place in oven at 120° C. for 16 hours to cure to a "Shore D" hardness of 54. Such combinations find utility as casting compositons for encapsulating electrical components.

6 parts of B–1, 0.9 part of C–1 were mixed to solution and placed in oven at 120° C. for 2 hours. There was noticeable thickening of the solution. Then this product was mixed with 5 parts of A–1 and this mix cured at 120° C. for 16 hours to cure to a "Shore D" hardness of 51. These combinations also may be used for encapsulating electrical components and is found to be slightly slower reacting than the other combination of this example.

Instead of B-1 any of the other materials (B) may be substituted therefore and reacted with an amine, and in all cases whether partial or complete reaction is effected, the resultant reaction product will be liquid at 300° F. and may be combined with any of the materials (A) and cured, to provide encapsulating resins for electrical components, in the manner above set forth.

*Example 10.*—60 parts of B-1 and 40 parts of C-2 were mixed together and maintained at 120° C. for 4 hours whereupon noticeable thickening had taken place due to reaction. Then to said mass was added 50 parts of A-1 and this combination was maintained at 120° C. for 24 hours whereupon the mass was cured. Such combinations may be used for encapsulating electrical components and cured in place.

Instead of B-1 any of the other materials (B) may be used in the initial reaction with a polycarboxylic acid, and in all cases whether partially or completely reacted, the resultant reaction product is liquid at 300° F. and may be combined with any of the other materials (A) and cured in the manner above set forth to provide encapsulating resins for electrical components.

I claim:

1. A composition of matter comprising a solution of (A) a glycidyl polyether of a material selected from the group consisting of polyhydric phenols and polyhydric aliphatic alcohols, said (A) having a 1,2-epoxide equivalency greater than 1 and being liquid at 300° F. and (B) a glycidyl ether of a monohydric phenol having on its ring nucleus an unsaturated hydrocarbon substituent of 10–28 carbon atoms, said unsaturation due solely to ethylenic linkage, the maximum ratio by weight of (B) to (A) being 300 to 100.

2. The composition of matter of claim 1 wherein the glycidyl polyether is a glycidyl polyether of 2,2 bis (parahydroxy phenyl) propane.

3. A composition of matter comprising a solution of (A) a glycidyl polyether of a material selected from the group consisting of polyhydric phenols and polyhydric aliphatic alcohols, said (A) having a 1,2-epoxide equivalency greater than 1 and being liquid at 300° F. and glycidyl ether of cardanol, the maximum ratio by weight of said glycidyl ether of cardanol to (A) being 300 to 100.

4. The composition of matter defined in claim 1, wherein (A) is glycidyl polyether of 2,2 bis (parahydroxy phenyl) propane and (B) is glycidyl ether of cardanol.

5. The combination of metallic drier and a composition of matter comprising a solution of (A) a glycidyl polyether of a material selected from the group consisting of polyhydric phenols and polyhydric aliphatic alcohols, said (A) having a 1,2-epoxide equivalency greater than 1 and being liquid at 300° F. and (B) a glycidyl ether of a monohydric phenol having on its ring nucleus an unsaturated hydrocarbon substituent of 10–28 carbon atoms, said unsaturation due solely to ethylenic linkage, the maximum ratio by weight of (B) to (A) being 300 to 100.

6. An organic reaction product of (I) a combination of (A) a glycidyl polyether of a material selected from the group consisting of polyhydric phenols and polyhydric aliphatic alcohols, said (A) having a 1,2-epoxide equivalency greater than 1 and being liquid at 300° F. and (B) a glycidyl ether of a monohydric phenol having on its ring nucleus an unsaturated hydrocarbon substituent of 10–28 carbon atoms, said unsaturation due solely to ethylenic linkage, and (II) a material selected from the group consisting of amines dicarboxylic acids and anhydrides thereof free of substituents reactable with the oxirane rings of said (A) and (B), the maximum ratio by weight of (B) to (A) being 300 to 100.

7. The combination of metallic drier and an organic reaction product of (I) a combination of (A) a glycidyl polyether of a material selected from the group consisting of polyhydric phenols and polyhydric aliphatic alcohols, said (A) having a 1,2-epoxide equivalency greater than 1 and being liquid at 300° F. and (B) a glycidyl ether of a monohydric phenol having on its ring nucleus an unsaturated hydrocarbon substituent of 10–28 carbon atoms, said unsaturation due solely to ethylenic linkage, and (II) a dicarboxylic acid, the maximum ratio by weight of (B) to (A) being 300 to 100.

8. A composition of matter comprising a solution of (A) a glycidyl polyether of a material selected from the group consisting of polyhydric phenols and polyhydric aliphatic alcohols, said (A) having a 1,2-epoxide equivalency greater than 1 and being liquid at 300° F. and an amine reaction product of (B) a glycidyl ether of a monohydric phenol having on its ring nucleus an unsaturated hydrocarbon substituent of 10–28 carbon atoms, said unsaturation due solely to ethylenic linkage, said amine being free of substituents reactable with the oxirane rings of (B), said amine reaction product being liquid at 300° F., the maximum ratio by weight of (B) to (A) being 300 to 100.

9. A composition of matter comprising a solution of (A) a glycidyl polyether of a material selected from the group consisting of polyhydric phenols and polyhydric aliphatic alcohols, said (A) having a 1,2-epoxide equivalency greater than 1 and being liquid at 300° F. and a dicarboxylic acid reaction product of (B) a glycidyl ether of a monohydric phenol having on its ring nucleus an unsaturated hydrocarbon substituent of 10–28 carbon atoms, said unsaturation due solely to ethylenic linkage, said dicarboxylic acid being free of substituents reactable with the oxirane rings of (B), said reaction product being liquid at 300° F., the maximum ratio by weight of (B) to (A) being 300 to 100.

References Cited in the file of this patent

UNITED STATES PATENTS

| | | |
|---|---|---|
| 2,453,634 | Marple | Nov. 9, 1948 |
| 2,467,171 | Werner et al. | Apr. 12, 1949 |
| 2,477,659 | Schaefer | Aug. 2, 1949 |
| 2,528,429 | Elliott et al. | Oct. 31, 1950 |
| 2,528,933 | Wiles | Nov. 7, 1950 |
| 2,572,803 | Elliott et al. | Oct. 23, 1951 |
| 2,665,266 | Wasserman | Jan. 5, 1954 |